United States Patent
Chiu

(10) Patent No.: US 9,804,374 B2
(45) Date of Patent: Oct. 31, 2017

(54) LENS AND LIGHT-EMITTING DEVICE EMPLOYING SAME

(71) Applicant: HON HAI PRECISION INDUSTRY CO., LTD., New Taipei (TW)

(72) Inventor: Po-Chin Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 14/922,703

(22) Filed: Oct. 26, 2015

(65) Prior Publication Data

US 2017/0030551 A1 Feb. 2, 2017

(30) Foreign Application Priority Data

Jul. 31, 2015 (TW) .............................. 104125024 A

(51) Int. Cl.
| | |
|---|---|
| *G02B 19/00* | (2006.01) |
| *F21V 5/04* | (2006.01) |
| *F21V 7/00* | (2006.01) |
| *F21Y 115/10* | (2016.01) |

(52) U.S. Cl.
CPC ............ *G02B 19/0061* (2013.01); *F21V 5/04* (2013.01); *F21V 7/0091* (2013.01); *G02B 19/0028* (2013.01); *F21Y 2115/10* (2016.08)

(58) Field of Classification Search
CPC .......... F21V 5/045; F21V 5/046; F21V 13/04; G02B 19/0028; G02B 19/0061; F21Y 2101/02
See application file for complete search history.

(56) References Cited

U.S. PATENT DOCUMENTS

| | | | | |
|---|---|---|---|---|
| 5,613,769 | A * | 3/1997 | Parkyn, Jr. ............ | F21V 7/0091 126/698 |
| 2002/0163810 | A1* | 11/2002 | West ....................... | H01L 33/58 362/307 |
| 2006/0238884 | A1* | 10/2006 | Jang ......................... | F21V 5/04 359/653 |
| 2007/0217195 | A1* | 9/2007 | Chen ....................... | H01L 33/58 362/255 |
| 2007/0268694 | A1* | 11/2007 | Bailey ................. | G02B 27/0955 362/231 |
| 2009/0129097 | A1* | 5/2009 | Ewert ................. | B29C 45/0025 362/328 |
| 2010/0073937 | A1* | 3/2010 | Ho ............................ | F21V 5/04 362/335 |

(Continued)

*Primary Examiner* — Mary Ellen Bowman
(74) *Attorney, Agent, or Firm* — Steven Reiss

(57) ABSTRACT

The present disclosure relates to a lens. The lens includes a bottom surface, a top surface, and a side surface. The side surface is connected to the bottom surface and the top surface, and between the top surface and the bottom surface. The center of the bottom surface is recessed towards the top surface, and forms a groove. The top surface is recessed towards the bottom surface, and the top surface is concave. The groove includes a top incident surface and a side incident surface. The side incident surface is connected to the top incident surface and the bottom surface. Some micro-structures are set on the top incident surface and form a rough surface. Some reflective films are set on the side incident surface. The present disclosure also relates to a light-emitting device employing the lens.

1 Claim, 3 Drawing Sheets

(56) References Cited

U.S. PATENT DOCUMENTS

| | | | | |
|---|---|---|---|---|
| 2010/0073938 A1* | 3/2010 | Ho | ............................ | F21V 5/04 |
| | | | | 362/335 |
| 2013/0194795 A1* | 8/2013 | Onaka | ........................ | F21V 5/04 |
| | | | | 362/231 |
| 2014/0204592 A1* | 7/2014 | Miyashita | .............. | F21S 48/115 |
| | | | | 362/311.06 |
| 2015/0117029 A1* | 4/2015 | Dai | .................... | G02B 19/0014 |
| | | | | 362/311.06 |

* cited by examiner

LENS AND LIGHT-EMITTING DEVICE EMPLOYING SAME

FIELD

The present disclosure relates to an optical lens and a light-emitting device employing the optical lens, particularly to an optical lens and a light-emitting device which can improve the uniformity and utilization of emerging ray.

BACKGROUND

Light emitting diode is a kind of optoelectronic semiconductor component which can convert current into light having a specific wavelength range. The light emitting diodes have high brightness, low voltage, low power consumption, simple drive, long life and other advantages, and easily match with integrated circuits, so the light emitting diode is widely used as a light source. The light emitting diode is usually coated with a lens around it for secondary optical correction after encapsulation.

BRIEF DESCRIPTION OF THE DRAWINGS

Implementations of the present technology will now be described, by way of example only, with reference to the attached figures, wherein.

DETAILED DESCRIPTION

Figure 1:
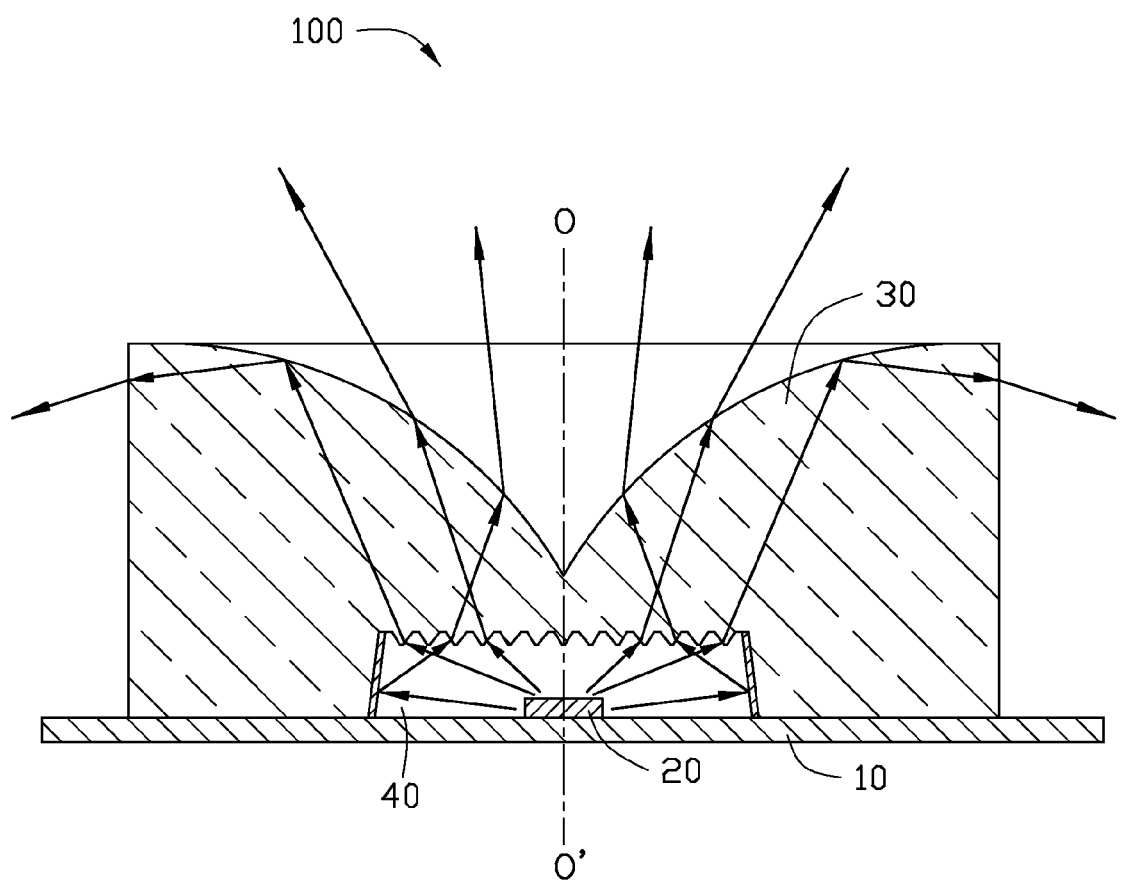
FIG. 1 is an cross-sectional, diagrammatic view of a light-emitting device, according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates a light-emitting device 100 according to an embodiment.

The light-emitting device 100 includes a substrate 10, a LED light source 20, and a lens 30. The LED light source 20 is covered by the lens 30

The substrate 10 can be a copper coated laminate or a printed circuit board. In the embodiment, the substrate 10 is a printed circuit board.

The LED light source 20 is set on the substrate 10. The LED light source 20 is packaged on the substrate 10 by flip chip technology. In the illustrated embodiment, the LED light source 20 is a cube. One side of the LED light source 20 is adhered on the substrate 10, and electrically connected to the substrate 10. The other five sides of the LED light source 20 can emit light.

Figure 2:
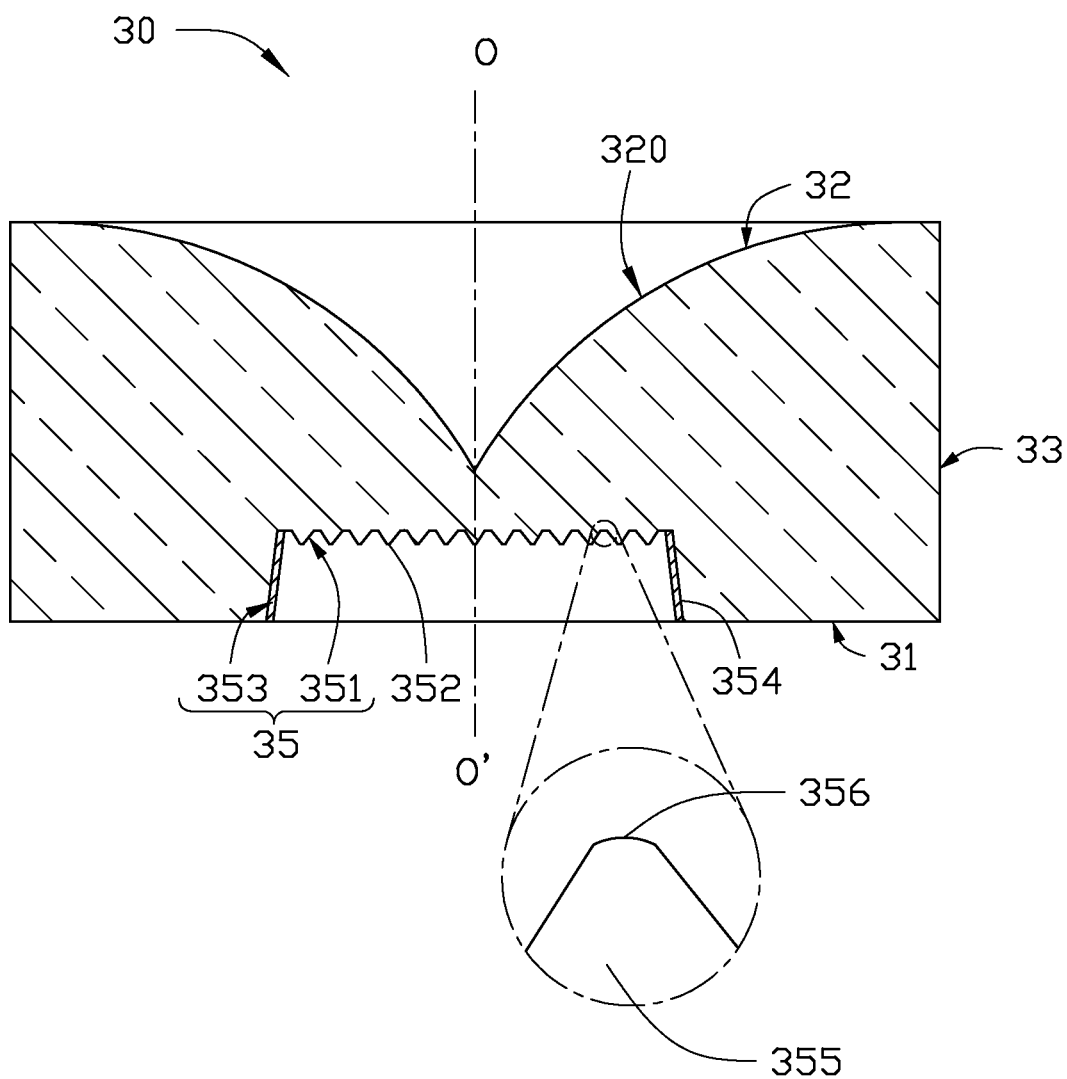
FIG. 2 is an cross-sectional, diagrammatic view of a lens of the light-emitting device of FIG. 1.

FIG. 2 illustrates the lens 30 includes a bottom surface 31, a top surface 32 and a side surface 33. The side surface 33 is connected between the bottom surface 31 and the top surface 32. In the embodiment, the lens 30 has an optical axis OO', and the lens 30 is symmetric about the optical axis OO'. The material of the lens 30 can be selected from the group comprising polycarbonate, polymethyl methacrylate and glass. The LED light source 20 is set on the optical axis OO' of the lens 30.

The bottom surface 31 is set on the substrate 10. The bottom surface 31 is a plane. The center of the bottom surface 31 is recessed towards the top surface 32, and forms a groove 35. The groove 35 can be a cube, a cylinder, or a cone, etc. In the embodiment, the groove 35 is a truncated cone.

The groove 35 includes a top incident surface 351 and a side incident surface 353. The top incident surface 351 is on the bottom of the groove 35. The side incident surface 353 is on the side wall of the groove 35. The side incident surface 353 is connected to the top incident surface 351 and the bottom surface 31. The top incident surface 351 is parallel to the bottom surface 31.

Figure 3:
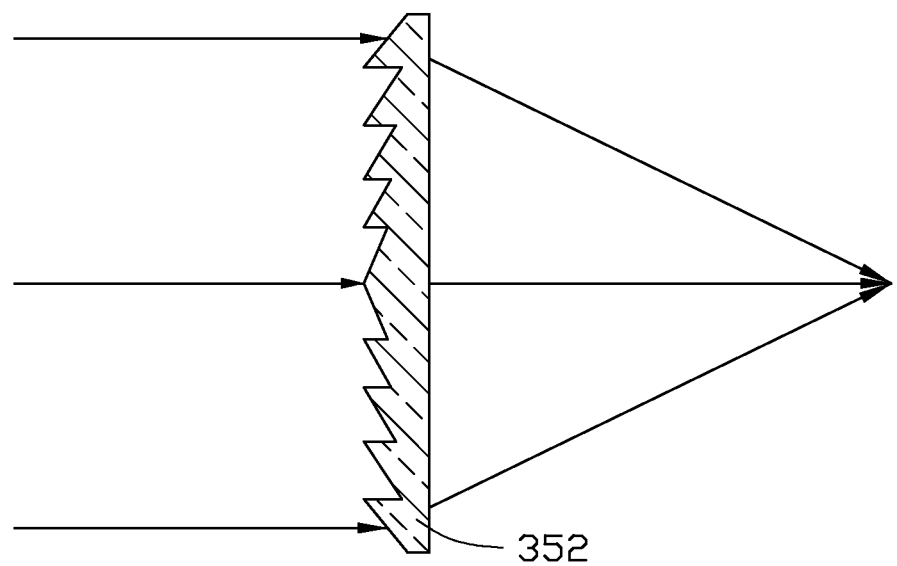
FIG. 3 is an cross-sectional, diagrammatic view of a micro-structure of a top incident surface of the lens of FIG. 2.

FIG. 2 and FIG. 3 illustrate the top incident surface 351 is provided with several microstructures 352, and forms a rough surface. The several microstructures 352 are presented with a ring-shaped jagged distribution. Ring-shaped sawteeth 355 are concentric circles, the jagged concentric circles constitute a Fresnel lens. The ring-shaped sawteeth 355 are roughly a same size. Each vertex of the sawteeth 355 is a curved surface 356, the radius of the curved surface 356 is larger than 0.2 mm.

A reflective film 354 is adhered on the side incident surface 353, which stops the light emitted by the LED light source 20 from exiting externally through the side incident surface 353. Reflective film 354 can be coated or plated on the side incident surface 353.

The top surface 32 is opposite to the bottom surface 31. The top surface 32 is recessed towards the bottom surface 31, and the top surface 32 is concave, a cross sectional line of the top surface 32 is substantially an upside down herringbone. The top surface 32 is composed of many arc surfaces 320 with different curvatures, the arc surfaces 320 by a smooth transition form the top surface 32. The top surface 32 is opposite to the top incident surface 351. An area of the top surface 32 is larger than an area of the top incident surface 351. The lowest point of the top surface 32 is higher than the highest point of the groove 35. According to the optical requirement, the half-apex angle of the top surface 32 is between 30 degrees and 60 degrees, thus, some light entering the lens 30 can be refracted into the external environment from the top surface 32.

The side surface 33 is connected between the bottom surface 31 and the top surface 32. An area of the side surface 33 is larger than an area of the side incident surface 353. Some of the light of the LED light source 20 is reflected by the top surface 32, then emits externally from the side surface 33, or is reflected back to the top surface 32 by the side surface 33.

FIG. 1 illustrates when in assembly, the LED light source 20 is packaged and positioned on the center of the substrate 10, the optical axis OO' of the lens 30 is aligned with the LED light source 20, the lens 30 is fixed on the substrate 10 by adhesive, then, the LED light source 20 is covered by the groove 35, the groove 35 is directly above of the LED light source 20, the groove 35 and the substrate 10 together constitute a confined space 40. The LED light source 20 is placed in the confined space 40.

When the light-emitting device 100 operates, the light of the LED light source 20 enters the lens 30 through the top incident surface 351, the light irradiating on the side incident surface 353 is reflected by the reflective film 354 multiple times and finally into the lens 30 through the top incident surface 351. The ring-shaped sawteeth 355 (or Fresnel lens) have an effect of converging light (as shown in FIG. 3), making most of the light converge into the top surface 32, then the light is refracted to the external environment or reflected to the side surface 33. The top surface 32 is concave. Due to the rough top incident surface 351 and the reflective side incident surface 353 most light emits externally through the top surface 32 and part of the side surface 33 which is close to the top surface 32, and homogenization of the emergent light is higher.

Compared with prior art, the present disclosure discloses a light-emitting device 100. The top surface 32 of the lens 30 is concave. The groove 35 includes top incident surface 351 and the side incident surface 353. The top incident surface 351 is provided with several microstructures 352, and forms a rough surface, a reflective film 354 is adhered on the side incident surface 353. When the lens 30 is matched with the LED light source 20, the light of the LED light source 20 enters the lens 30 emits only from the top incident surface 351, with the action of jagged structure on the top incident surface 351 and the top surface 32, which prevents the light emitting from the side surface 33 directly, improves the utilization of light from the LED light sources 20, and light from the light emitting device 100 is distributed increasingly uniform.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens, the lens comprising:
    a bottom surface having a center;
    a top surface opposite the bottom surface, wherein the center of the bottom surface curved upward towards the top surface to form a groove, the top surface curves downward to the bottom surface and is concave, the groove comprises a top incident surface and a side incident surface, the side incident surface is connected to the top incident surface and the bottom surface, the top incident surface has a plurality of microstructures arranged in concentric circles, a cross-section of the plurality of microstructures having a sawtooth pattern;
    a side surface connected with the bottom surface and the top surface; and
    a reflective film is adhered on the side incident surface;
    wherein each vertex of the sawtooth pattern is formed as a curved surface, and the radius of the curved surface is larger than 0.2 mm.

* * * * *